No. 801,434. PATENTED OCT. 10, 1905.
J. McE. AMES.
CAR AND TRUCK BOLSTER.
APPLICATION FILED JUNE 3, 1905.
4 SHEETS—SHEET 1.
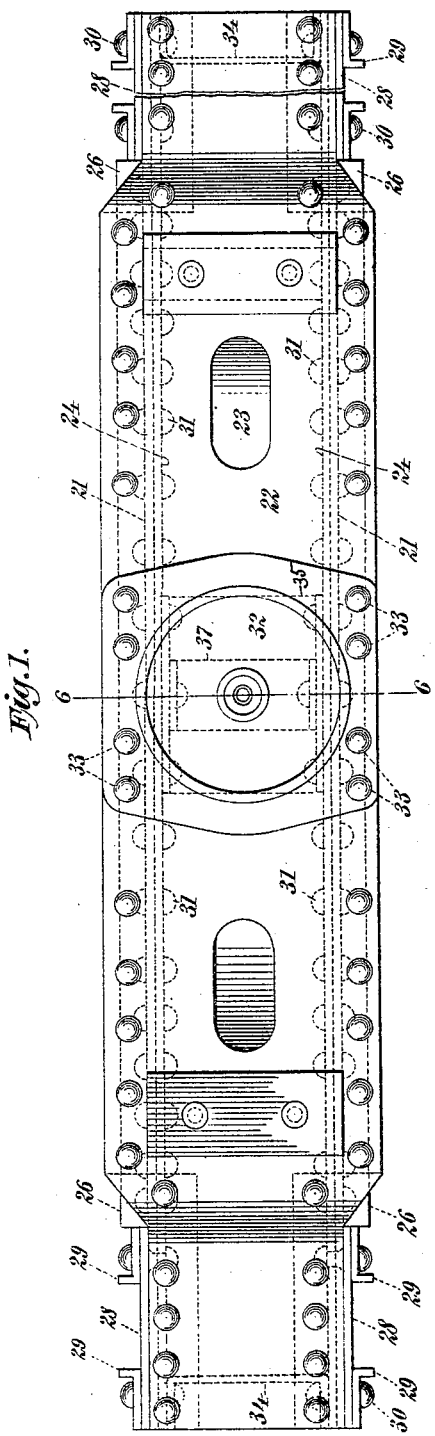
Fig. 1.
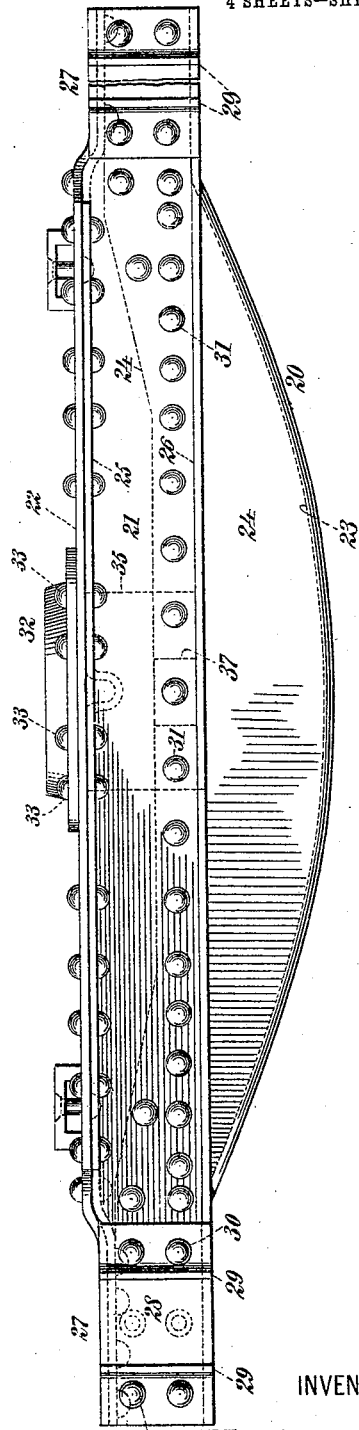
Fig. 2.
WITNESSES
Gustave Dieterich
Edwin H. Dietrich
INVENTOR
John McE. Ames
BY
ATTORNEY

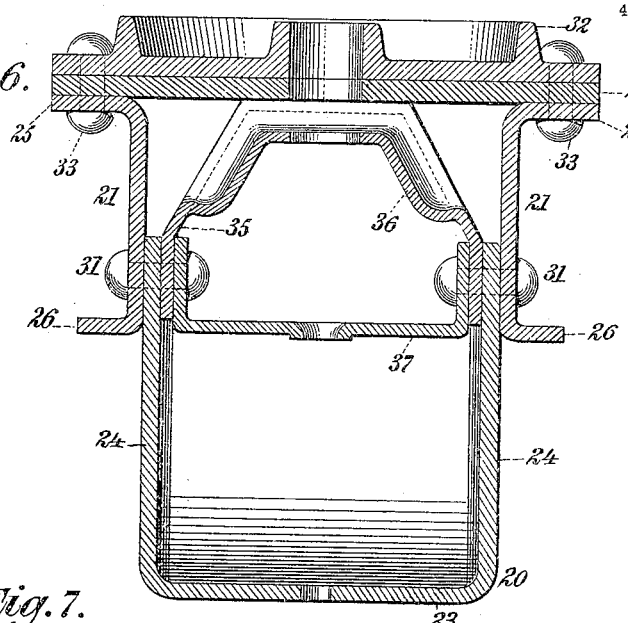
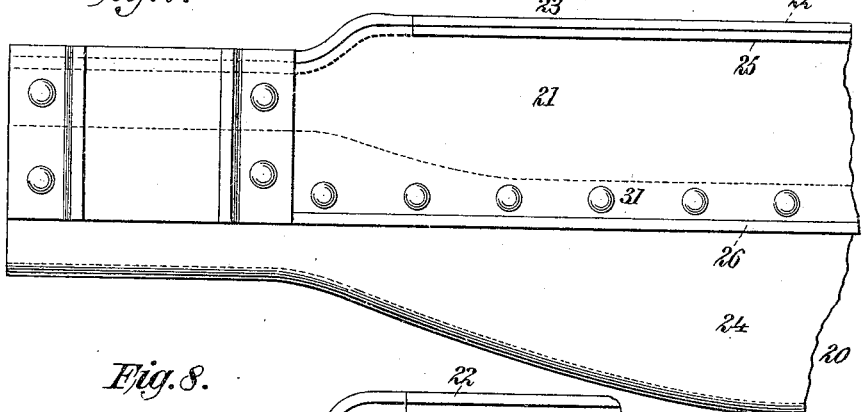
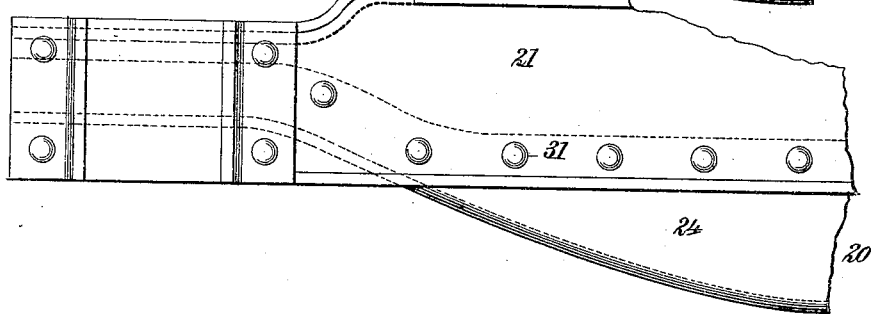

No. 801,434. PATENTED OCT. 10, 1905.
J. McE. AMES.
CAR AND TRUCK BOLSTER.
APPLICATION FILED JUNE 3, 1905.

4 SHEETS—SHEET 4.

WITNESSES:
Gustave Dieterich
Edwin H. Dietrich

INVENTOR
John McE. Ames
BY
Chas. E. Gill
ATTORNEY

UNITED STATES PATENT OFFICE.

JOHN McE. AMES, OF NEW BRIGHTON, NEW YORK, ASSIGNOR TO BENJAMIN A. HEGEMAN, JR., OF NORTH PLAINFIELD, NEW JERSEY.

CAR AND TRUCK BOLSTER.

No. 801,434.     Specification of Letters Patent.     Patented Oct. 10, 1905.

Application filed June 3, 1905. Serial No. 263,530.

*To all whom it may concern:*

Be it known that I, JOHN McE. AMES, a citizen of the United States, and a resident of New Brighton, in the county of Richmond and State of New York, have invented certain new and useful Improvements in Car-Truck Bolsters, of which the following is a specification.

The invention relates to improvements in car-truck bolsters; and it consists in the novel features, arrangements, and combinations of parts hereinafter described, and particularly pointed out in the claims.

The object of the invention is to produce a new and advantageous construction of bolster comprising a lower trough-shaped or "bath-tub" member and an upper member composed, preferably, of side channels and connecting top plate, the vertical sides of the lower member being in engagement with and riveted to the vertical sides of the upper member.

The bolster comprises various novel details of form and construction in addition to the broader features of the invention.

The invention will be fully understood from the detailed description hereinafter presented, reference being had to the accompanying drawings, in which—

Figure 3:
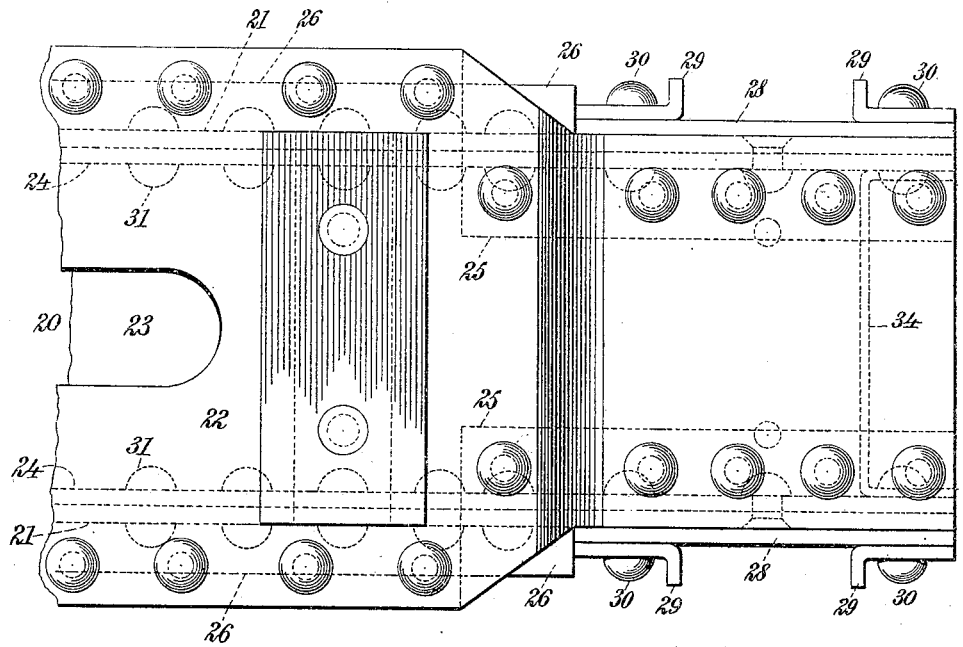
Figure 4:
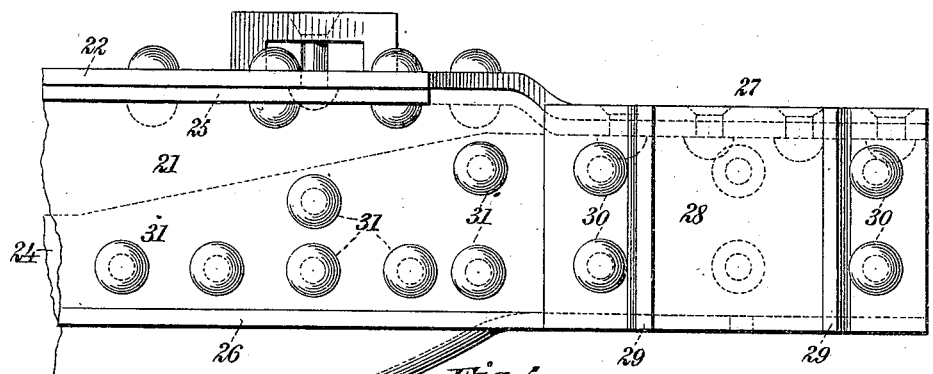
Figure 5:
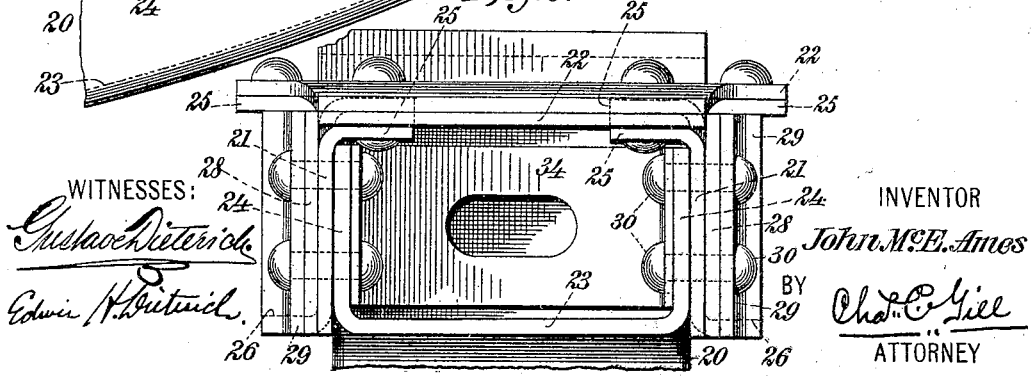

Figure 1 is a top view, partly broken away, of a bolster constructed in accordance with and embodying my invention. Fig. 2 is a side elevation of same. Fig. 3 is an enlarged top view of one end portion of the bolster. Fig. 4 is a side elevation of same. Fig. 5 is an end view, partly broken away, of same. Fig. 6 is a central vertical transverse section of the bolster on the dotted line 6 6 of Fig. 1. Figs. 7 and 8 are side elevations of portions of two bolsters and show modified arrangements of the respective lower members thereof; and Figs. 9 to 12, inclusive, are substantially central vertical transverse sections through several modified forms of bolsters embodying the invention.

In the drawings, 20 designates the lower trough-shaped or bath-tub member, 21 the sides of the upper member, and 22 the top plate riveted to the upper edge flanges of said sides and connecting the latter.

The lower member 20 comprises in one integral piece of steel the bottom 23 and sides 24, and the sides 21 of the upper member are preferably, though not necessarily, of sheet-steel pressed into channel form, whereby upper and lower flanges 25 26 are provided on the upper and lower edges of said sides. The top plate 22 is riveted to the flanges 25, and the sides 24 of the lower member are disposed against and riveted to the sides 21 of the upper member, said sides 24 preferably passing upwardly between the said sides 21.

The channel sides 21 correspond with each other and are of uniform width, vertically considered, throughout their length except at their end portions, where said sides are of reduced width, the reduction being at their upper edges to suitably provide the bolster with end portions 27, Fig. 2, adapted to pass through the truck side frames and seat upon the springs. (Not shown.) The upper flanges 25 of the sides 21 extend outwardly except along their end portions, where they extend inwardly, as shown by dotted lines in Fig. 3, and the top plate 22 at its end portions is cut away at its edges, so that it may not be wider than the span of the webs of said sides 21. The lower flanges 26 of the sides 21 extend outwardly, and they are absent from the end portions of said sides, whereby the end portions 27 of the bolster are left with plain vertical sides adapted to receive plates 28 and angle-iron guides 29, said plates and angle-iron guides being secured by rivets 30.

The sides 24 of the lower member 20 extend from end to end of the bolster and engage the full length of the webs of the sides 21, to which they are secured by rivets 31. The middle portion of the lower member 20 is deepest at its center, while the end portions of said member are horizontally disposed and furnish flat bottoms and vertical sides set between the end portions of the sides 21. The middle portions of the sides 24 do not extend upwardly to the top plate 22; but from said middle portions said sides incline upwardly and finally extend to the upper edges of the sides 21, the upper edges of the end portions of the sides 24 extending along close below the inwardly-turned end portions of the flanges 25.

Upon the center of the bolster is provided the center-bearing 32, which extends outwardly to the edges of the top plate 22 and is secured by rivets 33, which extend vertically through the edge portions of said center-bearing and top plate and through the upper flanges 25.

Within the ends of the bolster are secured the flanged cap-plates 34, having hand-holes to facilitate the riveting operations, and within the center of the bolster is secured a broad arched plate 35, Fig. 6, whose lower side portions are secured by some of the rivets 31 and whose upper side portions converge inwardly to the top portion of said plate, which engages and affords a support for the top plate 22, directly below the center-bearing. The upper portion of the plate 35 may be corrugated, as at 36, for strength and apertured below the aperture in the center-bearing. Between the lower portions of the sides of the plate 35 is riveted the flanged transverse plate 37, which acts as a brace and is apertured to receive the center pin.

In Figs. 1 to 6, inclusive, I illustrate the preferred construction of bolster, and in Fig. 7 I present a slightly-modified arrangement of the lower member 20, in that said member is set lower down between the sides 21. In Fig. 8 I illustrate the lower member 20 as having its end portions set upwardly between the sides 21.

Figure 9:
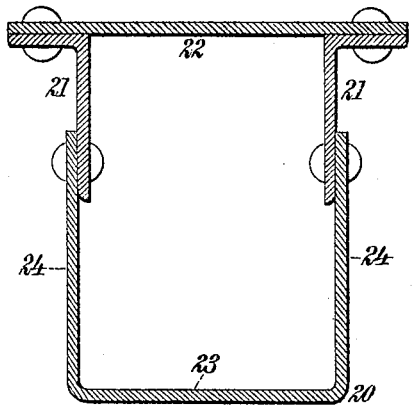
Figure 10:
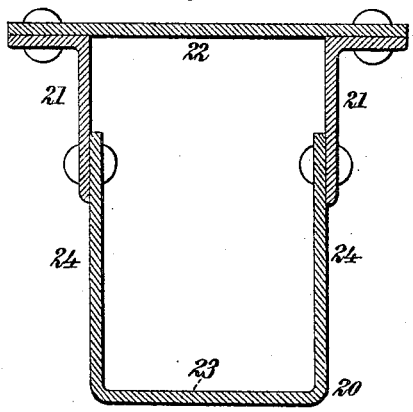
Figure 11:
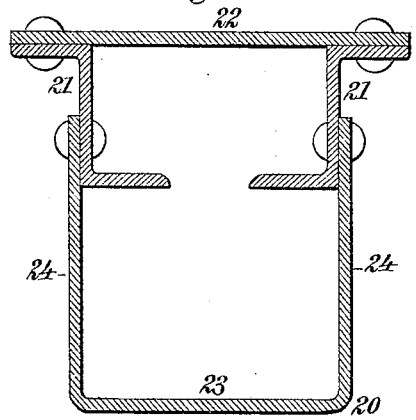
Figure 12:
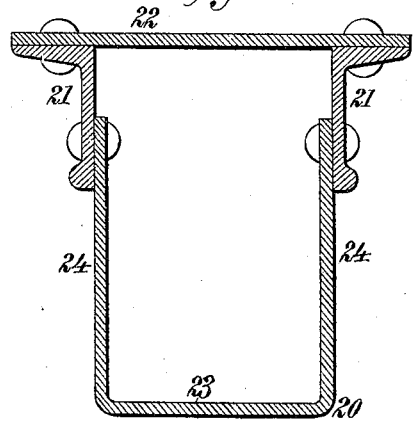

Figs. 9 to 12, inclusive, show several modifications that may be made in the construction presented in Figs. 1 to 6, inclusive. In Figs. 9 and 10 I illustrate the sides 21 as of angle-iron shape, the sides 24 of the lower member 20 being shown in Fig. 9 as secured to the outer faces of said sides 21 and in Fig. 10 as secured to the inner faces of said sides 21. In Fig. 11 I show the sides 21 as of Z shape in cross-section with the sides 24 of the lower member 20 secured to the outer faces of said sides 21. The sides 21 in Fig. 12 are shown as formed of bulb angles.

In all of the constructions presented the lower trough member may be adjusted vertically on the sides of the upper member before being secured thereto, this being due to the fact that the sides of said members are secured together in face-to-face contact and enable the adaptation of the bolster for different heights of cars.

The construction as a whole is of great durability and efficiency.

What I claim as my invention, and desire to secure by Letters Patent, is—

1. A box-girder-like bolster comprising an upper member having vertical sides and a top, and a lower trough member having a bottom and sides and being deepest at its center, the sides of said members being riveted together through their vertical portions, and the sides of said upper members being in depth about equal to the depth of the end portions of the bolster; substantially as set forth.

2. A box-girder-like bolster comprising an upper member having vertical sides and a top, and a lower trough member having a bottom and sides and being deepest at its center, the sides of said lower member being set within the sides of said upper member and riveted thereto, and the sides of said upper member being in depth about equal to the depth of the end portions of the bolster; substantially as set forth.

3. A box-girder-like bolster comprising an upper member having vertical sides with flanges along their upper edges and a top plate riveted to said flanges, and a lower trough member having a bottom and sides and being deepest at its center, the sides of said members being riveted together through their vertical portions, and the sides of said upper members being in depth about equal to the depth of the end portions of the bolster; substantially as set forth.

4. A box-girder-like bolster comprising an upper member having vertical sides with flanges along their upper edges and a top plate riveted to said flanges, said flanges being extended outwardly along the middle portions of said sides and inwardly along the end portions thereof, and a lower trough member having a bottom and sides and being deepest at its center, the sides of said members being riveted together through their vertical portions; substantially as set forth.

5. A box-girder-like bolster comprising an upper member having vertical sides with flanges along their upper edges and a top plate riveted to said flanges, said flanges being extended outwardly along the middle portions of said sides and inwardly along the end portions thereof, and a lower trough member having a bottom and sides and being deepest at its center and secured to said upper member; substantially as set forth.

6. A box-girder-like bolster comprising an upper member having channel sides and a top plate riveted thereto, and a lower trough member having a bottom and sides and being deepest at its center, the sides of said members being riveted together through their vertical portions; substantially as set forth.

7. A box-girder-like bolster comprising an upper member having channel sides and a top plate riveted thereto, and a lower trough member having a bottom and sides and being deepest at its center, the sides of said lower member being set within the sides of said upper member and riveted thereto; substantially as set forth.

8. In a bolster an upper member having channel sides and a top plate riveted thereto, the flanges along the upper edges of said sides being extended outwardly along the middle portions of their length and inwardly at the end portions of the bolster and the flanges along the lower edges of said sides being discontinued at the end portions of the bolster, and a lower trough member having a bottom and sides and being deepest at its center, the sides of said lower member being set within the sides of said upper member and riveted thereto; substantially as set forth.

9. In a bolster an upper member comprising sides flanged outwardly at their upper edges and a top plate riveted to said flanges, a center-bearing on said top plate and riveted through said plate and said flanges, and a lower trough member having a bottom and sides and being deepest at its center, the sides of said members being riveted together through their vertical portions; substantially as set forth.

10. In a bolster an upper member comprising sides and a top, a lower trough-shaped member deepest at its center and having its sides riveted to the vertical sides of said upper member, and an upwardly-arched plate within the bolster and riveted through the sides of said members; substantially as set forth.

11. In a bolster an upper member comprising sides and a top, a lower trough-shaped member deepest at its center and having its sides riveted to the vertical sides of said upper member, an upwardly-arched plate within the bolster and riveted through the sides of said members, and a transverse plate intermediate of and secured to the sides of said arched plate; substantially as set forth.

Signed at New York city, in the county of New York and State of New York, this 31st day of May, A. D. 1905.

JOHN McE. AMES.

Witnesses:
CHAS. C. GILL,
ARTHUR MARION.